US 10,350,873 B2

United States Patent
Dufort et al.

(10) Patent No.: US 10,350,873 B2
(45) Date of Patent: Jul. 16, 2019

(54) SYSTEM AND METHOD FOR REMOVING SUPPORT STRUCTURE FROM THREE-DIMENSIONAL PRINTED OBJECTS USING MICROWAVE ENERGY AND NANOPARTICLES

(71) Applicant: Xerox Corporation, Norwalk, CT (US)

(72) Inventors: Ron E. Dufort, Rochester, NY (US);
Linn C. Hoover, Webster, NY (US);
Erwin Ruiz, Rochester, NY (US);
Patrick J. Howe, Fairport, NY (US);
Andrew W. Hays, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 748 days.

(21) Appl. No.: 14/938,301

(22) Filed: Nov. 11, 2015

(65) Prior Publication Data

US 2017/0129183 A1 May 11, 2017

(51) Int. Cl.
*B33Y 10/00* (2015.01)
*B33Y 30/00* (2015.01)
(Continued)

(52) U.S. Cl.
CPC ............ *B33Y 10/00* (2014.12); *B29C 64/112* (2017.08); *B29C 64/386* (2017.08); *B29C 64/40* (2017.08);
(Continued)

(58) Field of Classification Search
CPC ......... B33Y 10/00; B33Y 40/00; B33Y 50/02; B33Y 30/00; B33Y 80/00; B29C 64/40;
(Continued)

(56) References Cited

U.S. PATENT DOCUMENTS

| 4,959,516 A | 9/1990 | Tighe et al. |
| 5,220,346 A | 6/1993 | Carreira et al. |

(Continued)

FOREIGN PATENT DOCUMENTS

| CN | 204196441 U | * | 3/2015 | |
| JP | 2004255839 A | * | 9/2004 | ........... B29C 64/112 |

(Continued)

OTHER PUBLICATIONS

JP-2004255839A Machine Translation of Description (EPO and Google).*

(Continued)

*Primary Examiner* — Christopher T Schatz
*Assistant Examiner* — Cynthia L Schaller
(74) *Attorney, Agent, or Firm* — Maginot, Moore & Beck LLP

(57) ABSTRACT

A method of manufacturing a three-dimensional object facilitates the removal of support material from the object. The method includes forming at least a portion of a support for the object with support material containing nanoparticles of a material that readily converts microwave energy into heat. The object and support are moved to a position opposite a microwave radiator and the microwave radiator is operated to begin a change of the phase of the portion of the support material containing the nanoparticles before beginning a change of the phase of a portion of the support made from the support material alone. A controller either monitors the expiration of a predetermined time period or a temperature of the object to determine when the microwave radiator operation is terminated.

5 Claims, 4 Drawing Sheets

(51) Int. Cl.
*B33Y 40/00* (2015.01)
*B33Y 50/02* (2015.01)
*B29C 64/112* (2017.01)
*B29C 64/386* (2017.01)
*B29C 64/40* (2017.01)
*B33Y 80/00* (2015.01)
*B29K 105/16* (2006.01)

(52) U.S. Cl.
CPC .............. *B33Y 30/00* (2014.12); *B33Y 40/00* (2014.12); *B33Y 50/02* (2014.12); *B29K 2105/162* (2013.01); *B33Y 80/00* (2014.12)

(58) Field of Classification Search
CPC ................ B29C 64/386; B29C 64/112; B29K 2105/162
See application file for complete search history.

(56) References Cited

U.S. PATENT DOCUMENTS

| | | |
|---|---|---|
| 5,422,463 A | 6/1995 | Gooray et al. |
| 5,563,644 A | 10/1996 | Isganitis et al. |
| 5,631,685 A | 5/1997 | Gooray et al. |
| 6,155,331 A | 12/2000 | Langer et al. |
| 6,869,559 B2 | 3/2005 | Hopkins |
| 8,459,280 B2 | 6/2013 | Swanson et al. |
| 2003/0222366 A1 | 12/2003 | Stangel et al. |
| 2005/0017393 A1* | 1/2005 | Stockwell ........... B29B 17/0005 264/113 |
| 2006/0054039 A1* | 3/2006 | Kritchman ........... B29C 64/245 101/424.1 |
| 2006/0158456 A1* | 7/2006 | Zinniel ................ B33Y 30/00 345/589 |
| 2013/0337277 A1 | 12/2013 | Dikovsky et al. |
| 2014/0265034 A1* | 9/2014 | Dudley ................ B33Y 10/00 264/401 |
| 2014/0332997 A1 | 11/2014 | Shih et al. |

FOREIGN PATENT DOCUMENTS

| | | |
|---|---|---|
| WO | 2014/177823 A1 | 11/2014 |
| WO | 2014/197086 A9 | 12/2014 |

OTHER PUBLICATIONS

CN-204196441U Machine Translation of Description (EPO and Google).*

Tsai, et al., "Efficiency of Microwave Heating of Weakly Loaded Polymeric Nanocomposites," Journal of Engineered Fibers and Fabrics, Special Issue, Jul. 2012.*

* cited by examiner

SYSTEM AND METHOD FOR REMOVING SUPPORT STRUCTURE FROM THREE-DIMENSIONAL PRINTED OBJECTS USING MICROWAVE ENERGY AND NANOPARTICLES

TECHNICAL FIELD

The system and method disclosed in this document relates to processing of three-dimensional printed objects and, more particularly, to the removal of support material from three-dimensional printed objects.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. In many three-dimensional object printers, support material is included in a layer to enable areas of object material in the layer to be formed where no surface or previously formed portions of the object exist. Particularly, these support areas are formed with a support material, such as wax, on top of areas of the object or adjacent to portions of the object. After the object is formed, the support material is removed from the object. The support material is typically removed by soaking the object in water, jetting water onto the object, soaking the object in chemicals other than water, or heating the object in a convection oven. However, each of these methods has limitations that are exacerbated as the size of the printed object increases.

As three-dimensional object printers become larger to increase the volume production of the printer, multiple parts can be stacked in three-dimensions, separated by support material. However, in these multiple object production runs, a substantial amount of support material must be removed after the objects are fully formed. What is needed is a method for efficient removal of substantial amounts of support material from printed parts in order to increase overall production speeds.

SUMMARY

A method of facilitating removal of support material from one or more three-dimensional printed objects includes operating a transport with at least one controller to move a platen, operating a first ejector head with the at least one controller to eject drops of a first material to form an object on the platen, operating a second ejector head with the at least one controller to eject drops of a second material alone towards the platen to form portions of a support for the object on the platen, operating a third ejector head with the at least one controller to eject drops of the second material containing nanoparticles towards the platen to form other portions of the support for the object on the platen, and operating a microwave radiator with the at least one controller to irradiate the object and the support for the object with microwave energy to enable the portions of the support containing the nanoparticles to begin to change phase from a solid to a liquid before the portions of the support formed with the second material alone begin to change phase from a solid to a liquid.

A system for printing three-dimensional printed objects with support material that facilitates support material removal from one or more three-dimensional parts includes a platen, a transport configured to move the platen, a first ejector head fluidly connected to a supply of a first material, a second ejector head fluidly connected to a supply of a second material, a third ejector head fluidly connected to a supply of the second material containing nanoparticles, a microwave radiator configured to irradiate an object on the platen, and at least one controller operatively connected to the first ejector head, the second ejector head, the third ejector head, and the microwave radiator, the at least one controller being configured to operate the first ejector head to eject drops of the first material towards the platen to form an object on the platen, to operate the second ejector head to eject drops of the second material towards the platen to form portions of a support for the object on the platen with the second material alone, to operate the third ejector head to eject drops of the second material containing the nanoparticles to form other portions of the support for the object on the platen, and to operate the microwave radiator to irradiate the object and the support for the object with microwave energy to enable the portions of the support containing the nanoparticles to begin to change phase from a solid to a liquid before the portions of the support formed with the second material alone begin to change phase from a solid to a liquid.

The system and method described above can produce an article of manufacture that facilitates removal of support material from a printed object. The article includes an object formed with a first material, a portion of a support for the object formed with a second material alone, and another portion of the support for the object formed with the second material in which nanoparticles are embedded. The portion of the support formed with the second material alone can be located on an exterior of the object and the other portion of the support for the object formed with the second material having nanoparticles can be located in an interior of the object to provide protection for the object during its exposure to microwave energy. The nanoparticles can consist essentially of ferromagnetic material.

BRIEF DESCRIPTION OF THE DRAWINGS

The foregoing aspects and other features of the method and printer are explained in the following description, taken in connection with the accompanying drawings.

DETAILED DESCRIPTION

Figure 1:
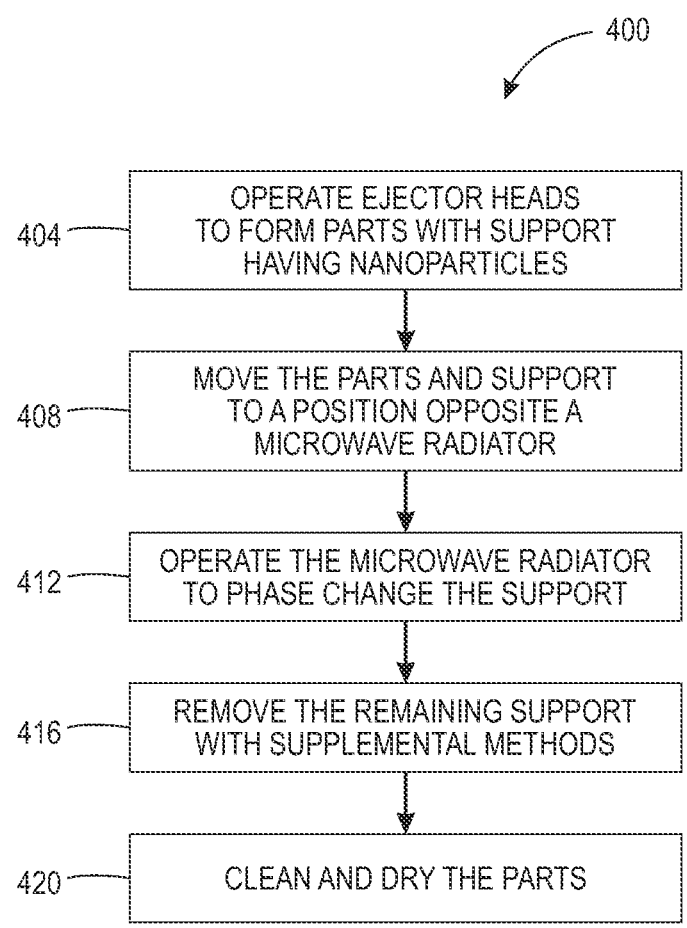
FIG. 1 shows a process for removing support material from a printed object with microwave energy.

For a general understanding of the environment for the method disclosed herein as well as the details for the method, reference is made to the drawings. In the drawings, like reference numerals designate like elements.

Figure 3:
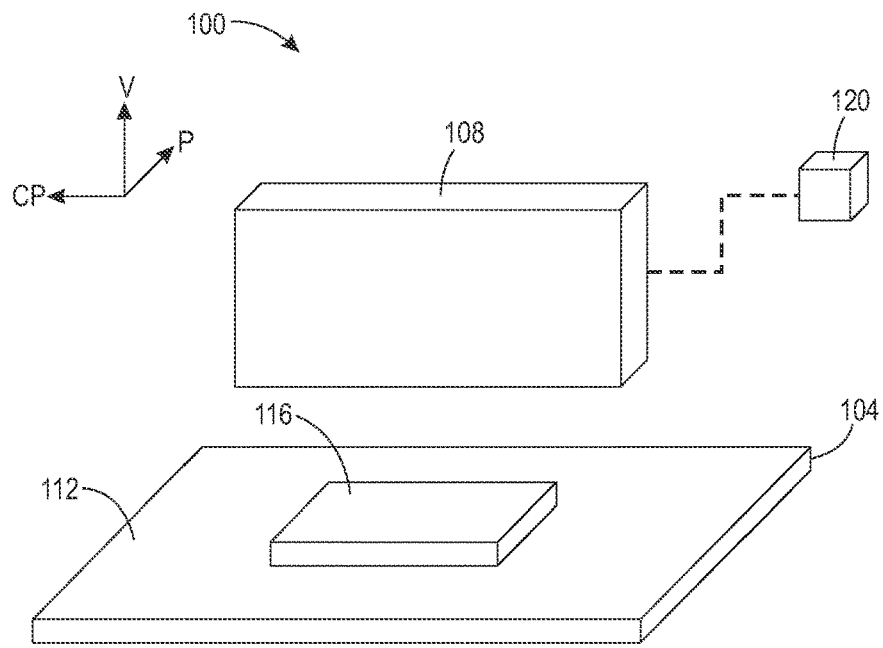
FIG. 3 shows a prior art three-dimensional object printer.

FIG. 3 shows a prior art three-dimensional object printer 100 that ejects material to form support and object areas in layers. The printer 100 comprises a platen 104 and an ejector head 108. The ejector head 108 has a plurality of ejectors configured to eject drops of material towards a surface 112 of the platen 104 to form a three-dimensional object, such as the part 116, and support areas that enable part feature formation. Particularly, the ejector head 108 has a first plurality of ejectors configured to eject drops of a build material to form an object and a second plurality of ejectors configured to eject drops of a support material, such as wax, to form a scaffolding to support the object being formed. As used in this document, "support" means one or more layers of support material on which layers of build material are built adjacent to or upon to enable layers of a portion of the object to be formed without deformation caused by gravity or laminar flow of the build material prior to the build material being converted from a fluid or powder to a solid by a curing process such as thermal fusing or exposure to UV radiation. "Support material" means a material used in the printing of an object that is removed from the object after the object is printed. The ejector head 108 is configured to move relative to the platen 104 in the process direction P, the cross-process direction CP, and the vertical direction V. In some embodiments, the printer 100 includes actuators configured to move one or both of the ejector head 108 and the platen 104 with respect to one another.

The printer 100 includes a controller 120 operatively connected to at least the ejector head 108. The controller 120 is configured to operate the ejector head 108 with reference to object image data that has been rendered into layers that form a three-dimensional object on the platen surface 112. To form each layer of the three-dimensional object, the controller 124 operates the printer 100 to sweep the ejector head 108 one or more times in the process direction P, while ejecting drops of material onto the platen 104. In the case of multiple passes, the ejector head 108 shifts in the cross-process direction CP between each sweep. After each layer is formed, the ejector head 108 moves away from the platen 104 in the vertical direction V to begin printing the next layer.

Figure 4:
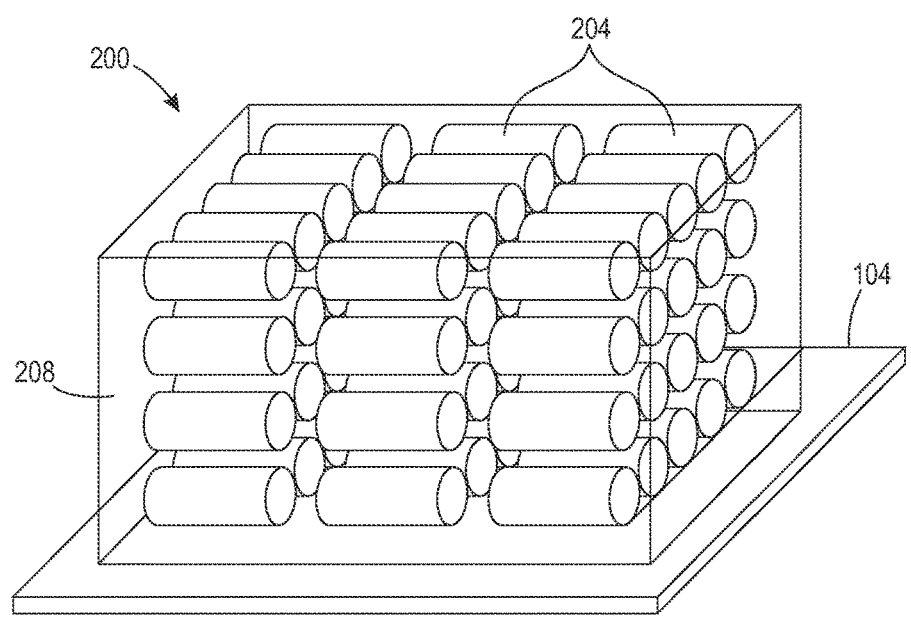
FIG. 4 shows a perspective view of a prior art printed block having a plurality of identical parts separated by support material.
Figure 5:
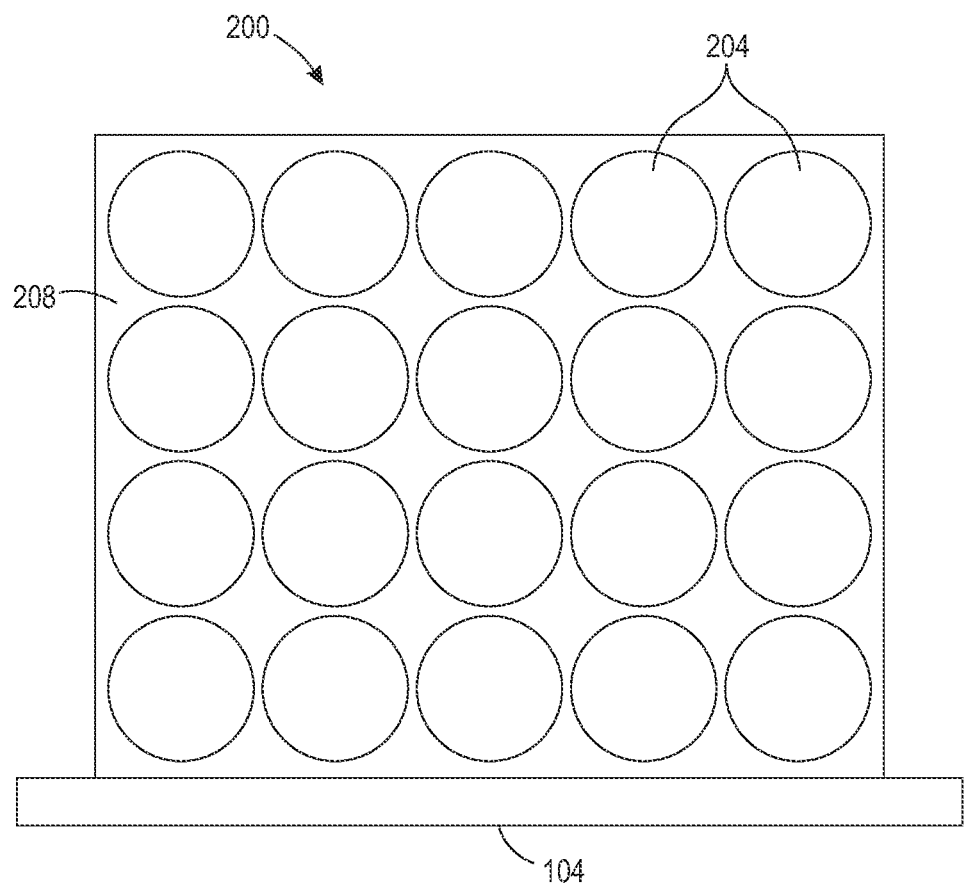
FIG. 5 shows a side view of the prior art block shown in FIG. 4.

In some embodiments, the printer 100 is sufficiently large to enable production runs comprising more than one part. Particularly, a plurality of parts can be printed in a single print job with each part being encapsulated by support material to form a block of material. In some embodiments, the controller 120 receives image data corresponding to a plurality of parts arranged in three-dimensional space with support material arranged between each of the parts to allow the plurality of parts to be printed as a single block. With reference to the image data, the controller 120 operates the ejector head 108 to form the plurality of parts in a single production run. FIG. 4 shows a perspective view of a prior art block 200 having a plurality of identical parts 204 formed on the platen 104. The parts 204 are essentially arranged in a three-dimensional matrix and can be uniformly spaced throughout the block 200. The parts 204 are separated by support material 208. In other embodiments, the plurality of parts may be different types of parts and may be arranged with respect to one another to efficiently use the space within the block 200. FIG. 5 shows a side view of the prior art block 200.

As shown in FIGS. 4 and 5, the block 200 comprises a substantial amount of support material 208 that must be removed to release the parts 204. To hasten the support material removal process that was performed with a convection oven, process 400 of FIG. 1 uses microwave energy to heat and phase change the support material 208, some or all of which is seeded with nanoparticles of material that readily converts microwave energy to heat. As used in this document, "nanoparticles" refers to pieces of a material having a size that enables them to flow through an ejector head, such as an inkjet printhead, and be ejected without easily becoming lodged in the printhead. In one embodiment, the diameters of the nanoparticles are in a range of about 5 nm to about 20 nm. In the description of the process 400, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 of the printer 100 noted above can be configured with components and programmed instruction to provide a controller or processor that performs the process 400. Alternatively, the controller can be implemented with more than one processor and associated circuitry and components, each of which is configured to form one or more tasks or functions described herein.

The method 400 begins by forming parts with build material and supporting portions of parts with support material, some or all of which contains nanoparticles of material that readily converts microwave energy to heat (block 404). Examples of materials that readily convert microwave energy to heat are iron, silicon carbide, and graphite. Ferromagnetic materials, such as those suspended in inks used in magnetic ink character recognition (MICR) systems, are especially useful as nanoparticles. The data used to operate the ejectors that eject support material can be separated into data used to operate ejectors that eject support material containing nanoparticles of material that readily converts microwave energy to heat and data used to operate ejectors that eject support material alone. The ejectors that eject support material having the nanoparticles are operated to build support for the part in interior areas of the part, while the ejectors that eject support material without the nanoparticles are operated to build support on external areas of the part. This formation of the part support with support material, some of which is doped with nanoparticles and some of which is not, better protects the build material of the part when exposed to microwave energy as explained in more detail below.

The process 400 continues by moving the parts away from the ejector heads to a position opposite a microwave radiator (block 408). The parts can be removed by lifting the parts 204 that contain support material 208 from the platen 104 or by moving the platen 104, which supports the parts 204 that contain the support material 208, out of the printer. If the parts require additional curing, they are exposed to the curing radiation or allowed to cool for solidification of the materials. Once the parts are cured, the bulk support material is removed by exposing the parts and support to microwave energy (block 412). The microwave energy melts the support for the parts without damaging the part. Forming the interior support for parts 204 with support material having nanoparticles and forming the exterior support for parts 204 with support material alone is particularly advantageous for part protection because the nanoparticles are better at converting microwave energy into heat than the support material alone. Thus, the support material surrounding the nanoparticles absorbs the heat generated by the nanoparticles while also being heated by the microwave energy. Consequently, the support material doped with the nanoparticles reaches its phase change temperature more quickly than the support material not having the nanoparticles. Thus, the interior support melts before the exterior support so the exterior support continues to absorb microwave energy and protect the build material of the part from heating to a temperature that deforms the part. When the last layer of the exterior support is melted, the part is ready.

In previously known methods for removing bulk support material, the parts 204 are placed in a convection oven heated to a predetermined temperature at which the support material 208 changes from a solid phase to a liquid phase. For example, a convection oven can be heated to a temperature of 65 degrees Celsius to melt wax support material provided the part is left in the oven cavity for an amount of time adequate for the support material to reach the melting temperature. The part 204 containing wax support material is typically left in the heated cavity of a convection oven at a temperature of 65 degrees Celsius for approximately 60 to 120 minutes to enable the wax support material to melt and separate from the part 204. The temperature of the part 204 is typically monitored and the part 204 is removed from the oven in response to the temperature of the part reaching a predetermined threshold temperature that is below the temperature at which the build material of the part begins to deform.

Because some of the support material may remain, process 400 includes part treatment that removes the smaller remaining amounts of support material (block 416). In one embodiment, this further treatment includes submerging the part 204 in a rinse solution held at a predetermined temperature, for example, 60 degrees Celsius, and subjected to ultrasonic vibrations in the solution. The ultrasonic vibrations in this embodiment are applied for approximately 5 minutes. Once the vibrations are terminated, the part remains in the solution for another predetermined period of time, such as 2 minutes, before the part is removed from the support material bath and placed in a cleaning vat. The cleaning vat typically includes warm soapy water and ultrasonic vibrations are again applied to the part in the soapy water for another predetermined time period, such as 20 minutes. After the part is cleaned in the cleaning vat, it is dried (block 420). The drying can occur in ambient air or in a convection oven heated to a relatively mild temperature, such as 40 degrees Celsius.

Figure 2A:
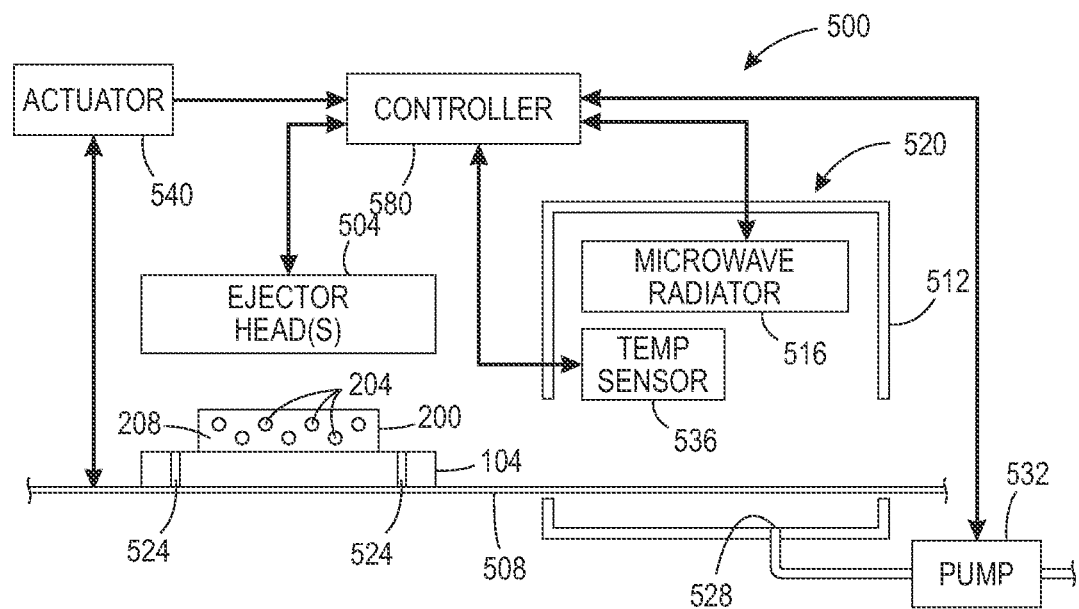
FIG. 2A depicts a system that enables support material to be removed from a printed object with microwave energy.

A three-dimensional object production system 500 is shown in FIG. 2A. The system 500 includes at least two ejector heads 504, a controller 580, a non-contact temperature sensor 536, a microwave radiator 516, and a housing 512. One of the two ejector heads ejects build material to form the part, while the other ejector head ejects support material containing nanoparticles. If support for the part is differentiated into exterior support for parts 204 made with support material not containing nanoparticles and interior support for parts 204 made with support material containing nanoparticles, then at least three ejector heads are provided. Controller 580 can be the controller 120 configured with programmed instructions and components to operate the ejector head(s) 504 to form an object with support material, some or all of which contains nanoparticles, and to operate the microwave heating station 520 to remove the support material. Each of the ejector heads contains a plurality of ejectors that the controller 580 operates to eject a plurality of materials to form object and support areas in the layers of the parts formed on the platen 104. The platen 104 is supported by a transport 508 that moves the block 200 with the parts 204 and the support material 208 from the position beneath the ejector head(s) 504 to the microwave heating station 520. The microwave heating station 520 includes the housing 512 having an ingress and egress to enable the transport 508 to move the block 200 into the housing 512 of the station 520 and then move the platen and the parts 204 out of the housing to the next processing station. Within the housing 512, a microwave radiator 516 is positioned to irradiate the block 200 with microwave energy while the transport 508 remains still to enable the block 200 to be subjected to the emitted microwave energy for a predetermined period of time or until the temperature of the parts 204 reach a temperature that indicates the part is approaching, but has not reached, a temperature that could damage the part. In the embodiment that monitors the part temperature, the non-contact temperature sensor 536 generates a signal indicative of the part temperature that the controller 580 compares to a predetermined temperature threshold. In one embodiment, the non-contact temperature sensor is a laser thermometer. When the predetermined temperature threshold has been reached or the predetermined time period has expired, the controller 580 operates an actuator 540 that drives transport 508 to move the parts 204 out of the housing to the next processing station. In an embodiment of system 500 that separates parts in a block 200, the more interior support material can be formed with higher concentrations of nanoparticles and then as the support material approaches the surface of the block, the support is formed with a gradient for the concentration of nanoparticles to enable the nanoparticles to be essentially absent at the surface.

Figure 2B:
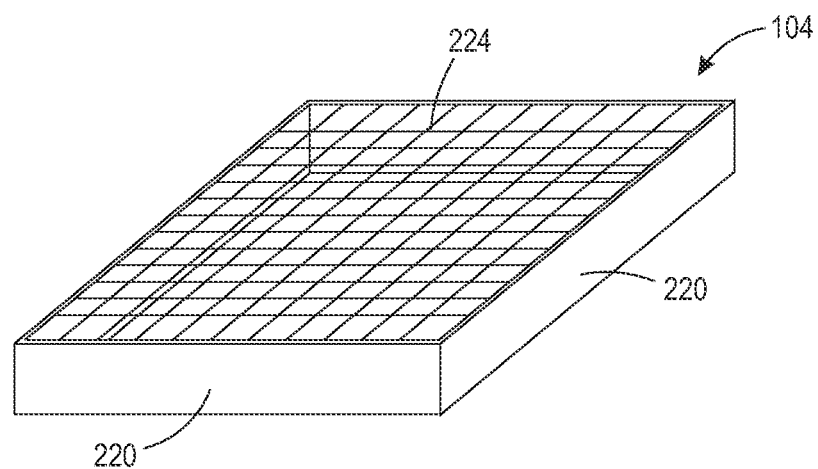
FIG. 2B depicts an alternate embodiment of the platen shown in the system of FIG. 2A.

The platen 104 shown in FIG. 2A includes one or more through holes 524 that enable the melted support material to leave the platen 104 and fall to the floor of the housing 512. The floor of the housing 512 includes a drain 528 that enables the melted support material to exit the housing 512. The controller 580 can be operatively connected to a pump 532 to urge the melted support material to leave the housing 512 or the floor of the housing 512 can be formed with a slope that enables the melted support material to flow to the drain 528 and leave the housing 512 under the effect of gravity. In another embodiment shown in FIG. 2B, the platen 104 is a box having solid sides 220 and an open top. A metal screen 224 is placed over the open top and the block 200 rests on the metal screen. During exposure to the microwaves, the melted support material flows through the metal screen into the metal box where it solidifies. The material solidifies because the openings in the screen are sized to prevent microwave energy from entering the box through the screen in a known manner.

The above-described method and system are effective for removing support material from the parts when the nanoparticles have a dielectric loss factor that is greater than a dielectric loss factor for the support material, which is greater than a dielectric loss factor of the build material. "Dielectric loss factor" is a measurement of the energy dissipated as heat by a material in an oscillating field. The dielectric loss factor of the nanoparticles enables the nanoparticles to melt the support material surrounding the nanoparticles more quickly than the support material alone melts, but the microwave energy heats the support material alone and produces a phase change in the support material alone without significantly heating the build material of the part. Thus, the support material can be melted and removed from the parts in a manner corresponding to the gradient of the nanoparticles embedded in the support material without damaging or adversely affecting the parts. Another advantage of using support materials with different dielectric loss factors is the support with the highest dielectric loss factor can be ejected as a boundary between individual parts 204 when the processing described with reference to block 208 is performed. When exposed to microwave radiation, the support with the highest dielectric loss factor heats faster and melts quicker than the surrounding support. Thus, the individual parts are separated from block 208 and can be further processed individually.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A system for producing a three-dimensional object comprising:
    a platen having at least one wall enclosing a volume and a screen positioned on an upper surface of the at least one wall to support the three-dimensional object, the screen having a plurality of openings that are sized to block microwave radiation;
    a transport configured to move the platen;
    a first ejector head fluidly connected to a supply of a first material;
    a second ejector head fluidly connected to a supply of a second material;
    a third ejector head fluidly connected to a supply of the second material containing nanoparticles, each nanoparticle having a diameter of no more than 20 nm;
    a microwave radiator configured to irradiate an object on the platen;
    a housing in which the microwave radiator is positioned, the housing having a first opening and a second opening; and
    at least one controller operatively connected to the transport, the first ejector head, the second ejector head, the third ejector head, and the microwave radiator, the at least one controller being configured to operate the first ejector head to eject drops of the first material towards the platen to form an object on the platen, to operate the second ejector head to eject drops of the second material towards the platen to form portions of a support for the object on the platen with the second material alone, to operate the third ejector head to eject drops of the second material containing the nanoparticles to form other portions of the support for the object on the platen, to operate the transport to move the platen supporting the object and the formed portions of the support [to the position] through the first opening in the housing to a position opposite the microwave radiator, and to operate the microwave radiator to irradiate the object and the formed portions and the formed other portions of the support for the object with microwave energy to enable the formed other portions of the support containing the nanoparticles to begin to change phase from a solid to a liquid before the portions of the support formed with the second material alone begin to change phase from a solid to a liquid so the melted support material passes through the openings in the screen and solidifies on a side of the screen opposite the side of the screen contacting the three-dimensional object.

2. The system of claim 1, the at least one controller being further configured to operate the second ejector head to form the portions of the support with the second material alone on exterior areas of the object on the platen and to operate the third ejector head to form the other portions of the support with the second material containing the nanoparticles on interior areas of the object on the platen.

3. The system of claim 1 further comprising:
    a pump operatively connected to the screen to urge the melted other formed support portions through the openings in the screen.

4. The system of claim 1, the at least one controller being further configured to:
    operate the transport to move the platen through the second opening of the housing to exit the housing in response to an expiration of a predetermined time period following activation of the microwave radiator.

5. The system of claim 1 further comprising:
    a non-contact temperature sensor configured to generate a signal indicative of a temperature of the object in the housing; and
    the at least one controller being operatively connected to the non-contact temperature sensor, the at least one controller being further configured to operate the transport to move the platen through the second opening of the housing to exit the housing in response to the signal generated by the non-contact temperature sensor reaching a predetermined temperature.

* * * * *